May 30, 1944.        J. SUNNEN        2,350,081
BORING MACHINE
Original Filed Feb. 3, 1940        2 Sheets-Sheet 1
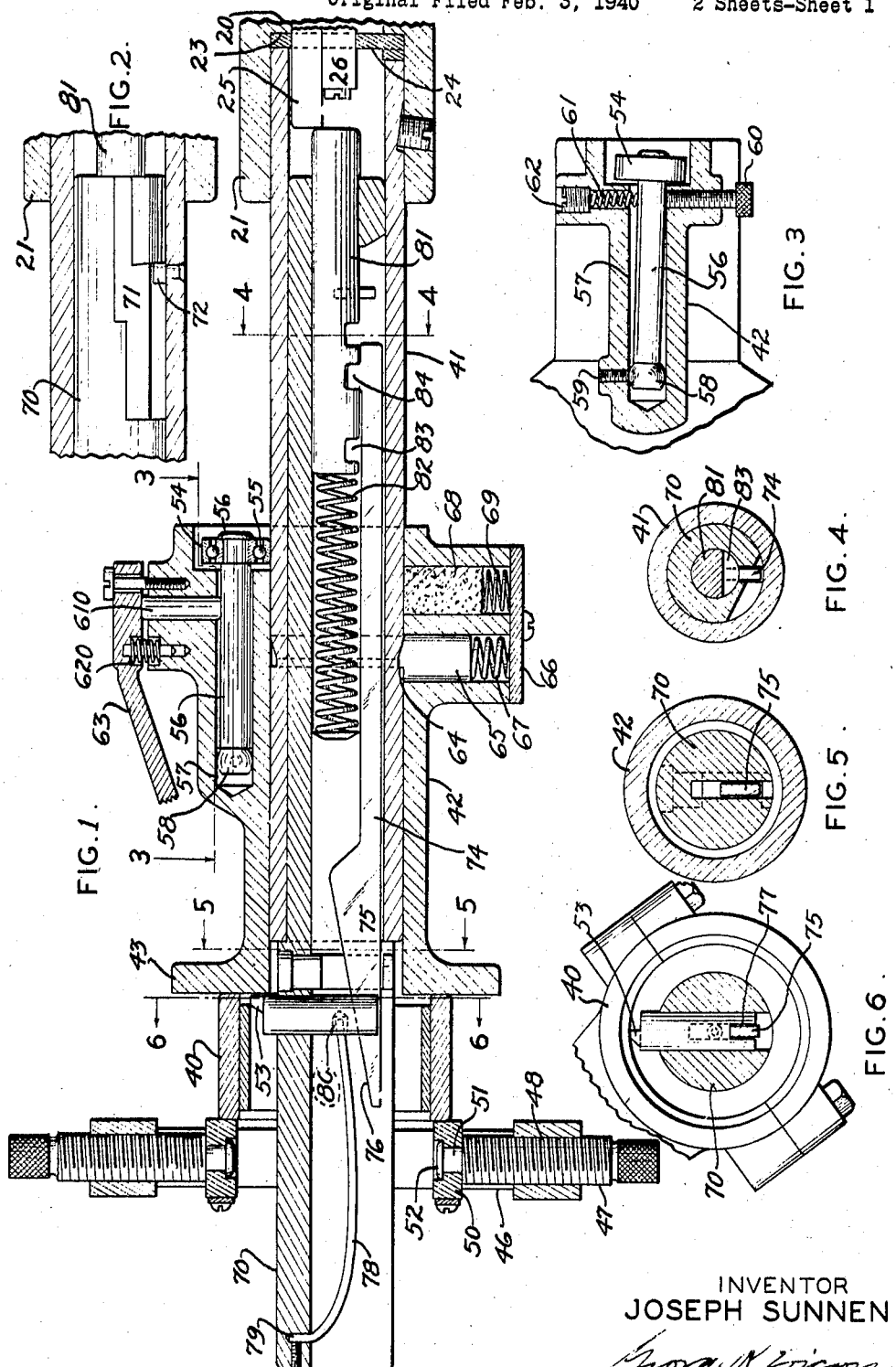
INVENTOR
JOSEPH SUNNEN
ATTORNEY May 30, 1944.                J. SUNNEN                2,350,081
                           BORING MACHINE
                  Original Filed Feb. 3, 1940    2 Sheets-Sheet 2
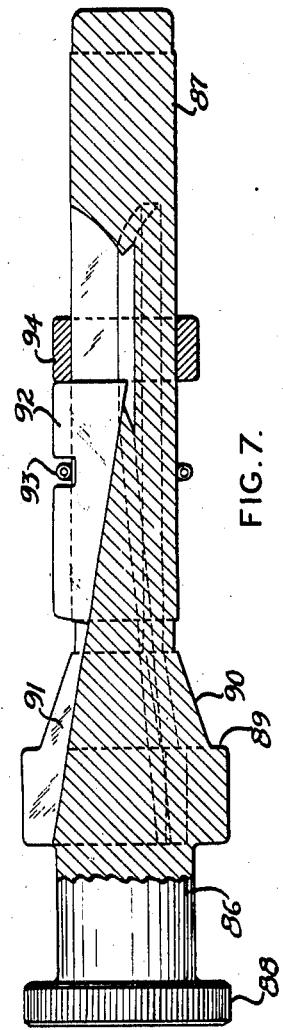
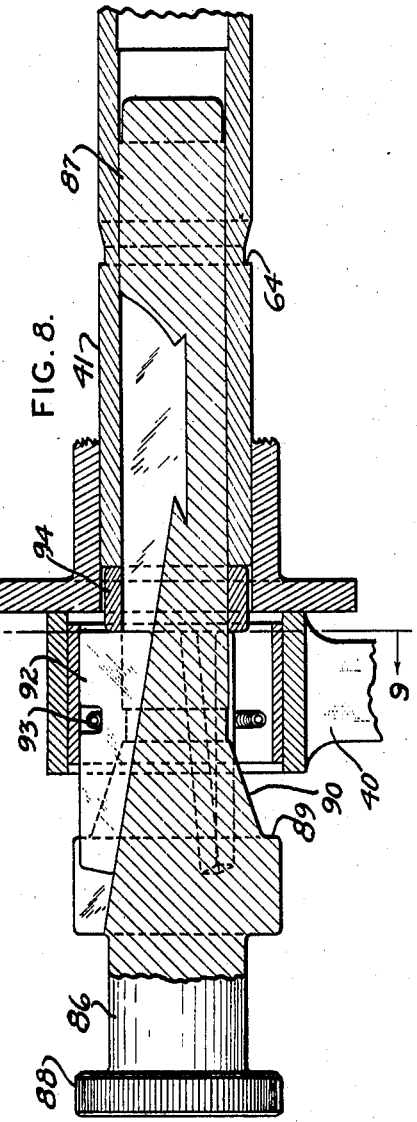
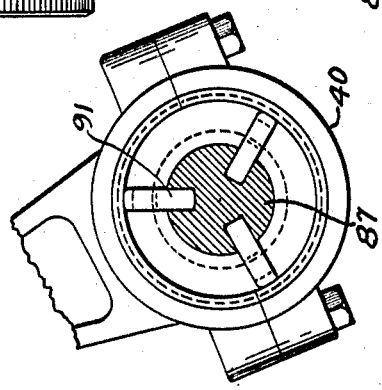
INVENTOR
JOSEPH SUNNEN
ATTORNEY Patented May 30, 1944

2,350,081

UNITED STATES PATENT OFFICE 2,350,081

BORING MACHINE

Joseph Sunnen, Clayton, Mo.

Original application February 3, 1940, Serial No. 317,074. Divided and this application October 16, 1941, Serial No. 415,154

4 Claims. (Cl. 77—55)

This invention relates to machine tools and particularly to centering devices for connecting rod boring machines. The machine for which the device is primarily designed is especially intended for boring out the big ends and bearing shells of connecting rods for internal combustion engines and finishing or refinishing them to an exact specified dimension, but it will be understood that the device may be applied to machines used for other purposes, and numerous modifications of the specific structure shown may be made within the scope of the invention.

The main feature of the invention claimed herein is the provision of a new and improved centering device for centering the work with respect to a boring bar or other working tool.

This application is a division of my previous application Serial No. 317,074, filed February 3, 1940.

The invention will be better understood, and other objects and advantages will appear from the following description and accompanying drawings, referring to which:

Fig. 1 is a longitudinal sectional view of the work holding and feeding mechanism and the boring bar in connection with which my invention is to be used.

Fig. 2 is a detail view, showing the bayonet joint mechanism for holding the boring bar in the spindle.

Fig. 3 is a detail sectional plan view, taken along the section line 3—3 of Fig. 1, showing the feed mechanism.

Fig. 4 is a cross sectional view of the spindle and boring bar, taken along the section line 4—4 of Fig. 1.

Fig. 5 is a cross sectional view, taken along the section line 5—5 of Fig. 1.

Fig. 6 is a cross sectional view, taken along the section line 6—6 of Fig. 1.

Fig. 7 shows the centering device which I provide for quickly and accurately centering the connecting rod with respect to the spindle, parts being in section and others broken away.

Fig. 8 is another view of the centering device, showing parts of the work holding mechanism, spindle, and the rod which is being centered.

Fig. 9 is a cross sectional view taken on the section line 9—9 of Fig. 8.

The spindle 20 of the boring machine in connection with which the device is used is provided with a longitudinal bore having an enlarged portion at the front end and a shoulder 23 against which is seated a plate 24 which is provided with an eccentric opening to receive the tool control plunger 25. This plunger is mounted on a shaft 26, which is axially movable for the purpose of adjusting the tool 53. The plunger is normally held in retracted position by any suitable means. This function is at least partially performed by the spring 82, but supplementary means may be added if desired. The shaft 26 is adjustable to the right or left with respect to Figure 1 by any suitable means (not shown) for the purpose of advancing or retracting cutting tool 53.

The work, which may for instance be a connecting rod 40, is mounted in a work holding mechanism or chuck which is rotatably and slidably mounted on spindle extension 41 having a bore accurately fitted to the cylindrical surface of the spindle extension and having a flange or face plate 43 against which one end of the work is to be clamped. The chuck 42 is provided with an adjustable clamp 46 which carries transverse screws 47 threaded into the ring-shaped clamp 46 as indicated at 48. The work is held in position by the contact members 50 which are rotatably mounted on the inner ends of the screws 47 which are provided with turned down portions 51 riveted over at the inner side of the contact members 50 as indicated at 52. This adjustable feature permits the adaptation of the chuck to boring rods of widely different sizes.

With the work held in the chuck, as shown in Fig. 1, the cutting tool 53 is rotated by the spindle and boring bar and the cylindrical boring is accomplished by sliding the chuck 42 along the spindle extension while manually holding the chuck and the work against rotation. The feeding of the chuck along the spindle extension 41 is accomplished by means of the roller 54. This roller is mounted on a ball bearing 55 which is fixed on the shaft 56. This shaft is loosely carried in a bore 57 formed in the body member 42, and the inner end of the shaft is provided with a spherical section 58, having a recess at one side to receive the point of the locating screw 59. An adjusting screw 60 is mounted at one side of the shaft 56 and a spring 61 is held in position to oppose the action of the screw 60 by means of a screw plug 62. As will be seen by reference to Figs. 1 and 3 the axis of the shaft 56 and roller 54 may be adjusted into or out of parallelism with the axis of the spindle extension 41 in either direction by adjusting the screw 60.

The roller 54 may be pressed into contact with the spindle extension 41 by the plunger 610 which is controlled by the spring 620 and a manually operated lever 63. Pressure on the lever 63 forces the plunger 610 into contact with the shaft 56 thereby causing it to ride firmly on the spindle 41, the friction being sufficient to drive the chuck along the spindle extension during the rotation thereof.

As long as the axis of the roller 54 is parallel to the axis of the spindle extension relative rotation between the spindle extension and the chuck 42 merely produce rotation of the roller 54, but when the screw 60 is adjusted to throw the axis of the shaft 56 out of parallelism with the axis of the spindle 41 as indicated in Fig. 3 rotation of the spindle 41 while the chuck 42 is held stationary produces a relative feeding of the chuck along the spindle so that the boring tool 53 can be fed regularly through the rod or shell which is being bored.

In order to prevent the chuck 42 being moved too far to the left with respect to Fig. 1 which would result in the boring tool 53 boring into the flange 43 I provide a circular groove or shoulder 64 and a spring pressed plunger 65 normally held in contact with the spindle extension 41 by the cover plate 66 and spring 67. This plunger 65 may be held against rotation by any suitable means such as a key-way (not shown) and is provided with a shoulder conformed to the shoulder 64 to limit the movement of the chuck along the spindle extension. A grease pack 68 held in contact with the spindle extension by the light spring 69 may also be provided. The boring bar 70 is fitted into the bore of the spindle extension and is quickly attachable or detachable by means of the bayonet joint construction 71 engaging the pin 72 which is mounted in the spindle extension 41. The boring bar is longitudinally slotted at one side to receive the tool control cam 74. This member is provided with a head 75 having a cam surface 76 which extends through the slot 77 in the boring tool and slidably contacts the bottom of the slot and moves toward the work against the pressure of the spring 78 which has one end rigidly mounted in the boring bar as indicated at 79 and the other end projecting into an opening 80 in the boring tool. The spring tends to withdraw the boring tool and its action is limited by the cam surface 76. Slidably mounted in the rear end of the boring bar is a plunger 81 which is biased toward the right with respect to Fig. 8 by means of the compression spring 82. The plunger 81 is provided with a plurality of longitudinally spaced notches 83 to receive projection 84 at the rear end of the tool operating member 74. By selectively locating the projection 84 in the notches 83, a wide range of radial movement of the tool 53 is obtainable. The plunger 81 contacts the end of the tool controlling plunger 25 and is longitudinally movable with respect to the boring bar.

After boring a trial hole in the connecting rod 40 the operator stops the spindle and withdraws the boring bar by rotating it manually in a clockwise direction about a quarter turn which disengages the bayonet slot. As the bar is withdrawn spring 82 withdraws the cam head 75 and allows the withdrawal of the boring tool by the spring 78, thus further insuring that there will be no scratching of the surface of the hole by the tool. The bar is then withdrawn from the spindle extension and the hole may be inspected and measured.

The original centering of the rod which is to be bored with respect to the chuck and spindle is accomplished with the aid of the centering tool which is best shown in Figs. 7, 8 and 9. The centering tool comprised a cam body member 86 having a shank 87 accurately finished to slidable fit in the bore of the spindle extension 41 when the boring bar 70 is removed. The outer end of the centering tool is provided with a knurled handle 88 and shoulder 89 having a tapered extension 90. Between the tapered portion and the shank 87 three longitudinal slots 91 are formed to receive the jaws 92 which are resiliently held in position by the circular coil spring 93.

The slots 91 are tapered at the bottom on an angle which is the supplement of a similar angle at the inside of the centering jaws 92, and the jaws are so formed that as they are moved along the shank to the right or left with respect to Figs. 7 and 8 the inner side of the jaws is held in contact with the bottom of the slots 91 by the spring 93 and the outer edges of the jaws are equidistant from the axis of the centering tool. A sleeve 94 is slidably mounted on the shank 87 and arranged to contact the ends of the jaws 92 so as to slide them along the cam surface at the bottom of the slots 91.

The connecting rod 40 being placed in juxtaposition to the flange member 43 and with its big end bore manually aligned with the opening in the end thereof, the shank 87 of the centering tool is inserted in the bore in the spindle extension 41. It will be understood, of course, that the boring bar will have been removed for the centering operation. The centering tool is then manually moved into the bore of the spindle sleeve until the sleeve 94 contacts the end of the spindle sleeve. Further movement causes the jaws 92 to be slid upwardly along the cam surfaces until further movement is limited by the bore of the connecting rod which limitation of the movement results in the centering of the connecting rod with respect to the spindle sleeve. This having been done the jaws 50 of the clamp are roughly adjusted as indicated in Fig. 1, the clamp screws adjusted first loosely and then more firmly to hold the connecting rod in position to be bored. Once the connecting rod is firmly adjusted in position the centering tool is withdrawn and the boring bar is inserted so that the rod may be bored.

I claim:

1. Centering mechanism for boring machines comprising a body member having a substantially cylindrical surface adapted to be slidably fitted to a corresponding cylindrical surface carried by the spindle of the boring machine, said body member having three or more longitudinal grooves, said grooves having their bottoms formed at an angle to the axis of said body member, slide members fitting in said grooves and adapted to slidably follow the bottoms thereof during longitudinal movement of said slidable members along said grooves, a sleeve member at the inner ends of said slidable members, said sleeve member being adapted to contact the cylindrical surface of said body member and to form a contact between the end of the spindle and the ends of said slidable members, the outer edges of said slidable members lying in a surface of rotation, and a spring device for holding said slidable members against the bottom of said grooves.

2. Centering mechanism for boring machines comprising a body member having a substantially cylindrical shank adapted to slidably fit the bore of the spindle of the boring machine, three or more equally spaced longitudinal grooves formed in said body member and extending into said shank, the bottoms of said grooves being formed at an angle extending downwardly as the groove approaches the end of said shank which is to enter the spindle, slidable members in each of said grooves, said slidable members having their inner edges in contact with the bottoms of their respective grooves, the outer edges of said slidable members being provided with a recess, spring device mounted in said recess for holding said slidable members against the bottoms of said grooves and said members being so constructed and arranged as to be shifted in their respective grooves by thrust against the end portion of said spindle when said shank is inserted therein.

3. Centering mechanism for boring machines comprising a body member having a substantially cylindrical shank adapted to slidably fit the bore of the spindle of the boring machine, three or more equally spaced longitudinal grooves formed in said body member and extending into said shank, the bottoms of said grooves being formed at an angle extending downwardly as the groove approaches the end of said shank which is to enter the spindle, slidable members in each of said grooves, said slidable members having their inner edges in contact with the bottoms of their respective grooves, the outer edges of said slidable members being provided with a recess, spring device mounted in said recess for holding said slidable members against the bottoms of said grooves, and a sleeve slidably mounted on the cylindrical portion of said body member, one end of said sleeve being adapted to contact the ends of said slidable members to move them along the grooves and the other end of said sleeve being adapted to contact said spindle as the cylindrical shank is inserted in the bore thereof.

4. A centering device for use with a machine spindle having a bore with respect to the axis of which a work piece is to be positioned, said device including a body member having a shank to fit into said bore and be centered thereby, longitudinally extending grooves in said body member, slidable members in said grooves, each of said slidable members having one of their faces in sliding contact with one wall of the groove in which it is positioned, and the abutting faces of the members and grooves being inclined longitudinally of the device, said members including radial portions capable of expansion beyond the peripheral face of said device and end portions in operative association with the end portion of said spindle to cause their longitudinal movement in said grooves by axial shifting of said shank in said bore, whereby said slidable members are caused to expand to engage the work piece to position same with respect to the axis of said bore.

JOSEPH SUNNEN.